(12) United States Patent
Heller et al.

(10) Patent No.: US 6,888,807 B2
(45) Date of Patent: May 3, 2005

(54) APPLYING SESSION SERVICES BASED ON PACKET FLOWS

(75) Inventors: Howard A. Heller, Indialantic, FL (US); James A. Proctor, Jr., Melbourne Beach, FL (US)

(73) Assignee: IPR Licensing, Inc., Wilmington, DE (US)

( * ) Notice: Subject to any disclaimer, the term of this patent is extended or adjusted under 35 U.S.C. 154(b) by 58 days.

(21) Appl. No.: 10/166,576

(22) Filed: Jun. 10, 2002

(65) Prior Publication Data

US 2003/0227880 A1 Dec. 11, 2003

(51) Int. Cl.[7] .............................................. H04Q 7/00
(52) U.S. Cl. ..................................... 370/328; 370/392
(58) Field of Search ................................ 370/244, 246, 370/248, 338, 356, 390, 392, 395, 397, 399, 409, 428; 709/223, 238, 243, 232, 228

(56) References Cited

U.S. PATENT DOCUMENTS

| | | | | |
|---|---|---|---|---|
| 6,286,052 B1 | * | 9/2001 | McCloghrie et al. | 709/238 |
| 6,452,915 B1 | * | 9/2002 | Jorgensen | 370/338 |
| 6,466,984 B1 | * | 10/2002 | Naveh et al. | 709/228 |
| 6,519,636 B2 | * | 2/2003 | Engel et al. | 709/223 |
| 6,587,457 B1 | * | 7/2003 | Mikkonen | 370/356 |

OTHER PUBLICATIONS

"The Reason Header Field for the Session Initiation Protocol," http://www.amaranth.com/ietf/drafts/draft-schulzrinne-sip-reason-00.txt, downloaded Feb. 11, 2002 (5 pp.).

"SDP: Session Description Protocol, " http://www.amaranth.com/ietf/drafts/draft-ietf-mmusic-sdp-new-04.txt, downloaded Feb. 11, 2002 (42 pp.).

L2TP Header Compression ("L2TPHC"), http://www.amaranth.com/ietf/drafts/draft-ietf-12tpext-12tphc-04.txt, downloaded Feb. 11, 2002 (9 pp.).

"Internet Draft SIP, " http://www.amaranth.com/ietf/drafts/draft-ietf-sip-rfc2543bis-07.txt, downloaded Feb. 12, 2002 (12 pp.).

* cited by examiner

*Primary Examiner*—Huy D. Vu
*Assistant Examiner*—Daniel Ryman
(74) *Attorney, Agent, or Firm*—Hamilton, Brook, Smith & Reynolds, P.C.

(57) ABSTRACT

Session services are employed in a networked computing environment to apply specific processing to an exchange of data between processes. In a wireless communication network, a single wireless link is typically shared among multiple users through wireless channels, which are allocated and switched among the users on a demand basis. Packets sent over the wireless link need to be signaled and tagged accordingly to initiate and employ the session service for the intended packets which comprise the flow. A method for identifying and applying session services to a wireless link includes identifying a packet flow over the wireless link corresponding to a received message by employing a flow identifier and filter. The packet flow corresponds to a session, and is mapped to at least one session service. The mapped session service is then applied to the received message. A session service may therefore be transparently applied to a packet flow over a wireless link independently of the other packet flows which may also be transmitted over the wireless link.

36 Claims, 7 Drawing Sheets

APPLYING SESSION SERVICES BASED ON PACKET FLOWS

BACKGROUND OF THE INVENTION

In a networked computing environment, session services are often employed to apply specific processing to an exchange of data between processes. Such an exchange, or session, usually includes a sequence of packets, also called a packet flow, which share a common context, and which can collectively benefit from the application of one or more session services. Packet flows are typically employed between processes communicating via the network, often in a client/server arrangement. A session service may include, for example, different types of protocol conversion or protocol optimizations, such as proxy services and header compression, and may be transparent to an end user.

Often, a single physical connection, such as a dialup modem line, carries many packets corresponding to a plurality of packet flows. However, a session service is typically applied to the physical connection as a whole. Accordingly, a particular session service is applied to all packets transmitted via the physical connection. Application of the session service does not distinguish among different packet flows carried over the connection. Individual flows, therefore, and the associated processes, may incur the processing overhead associated with a particular session service regardless of whether the session service is needed or desired for the packet flow in question.

In a wireless communication network, a wireless link is typically shared among multiple users through wireless channels, which are allocated and switched among the users on a demand basis by a scheduler. Packets sent over the wireless link need to be signaled and tagged accordingly to initiate and employ the session service for the intended packets which comprise the packet flow. Accordingly, it would be beneficial to provide a mechanism for signaling initiation of a particular session service by the sender and receiver over the wireless link, and for tagging affected packets to indicate which session service to apply to each packet.

SUMMARY OF THE INVENTION

In a wireless communication system, a method for identifying and applying session services to a wireless link comprises establishing a connection including the wireless link and receiving a message for transmission via the connection. A packet flow is identified or established over the wireless link corresponding to the received message by employing a flow identifier and a transmission profile filter. The packet flow corresponds to a session, and is mapped to at least one session service. The mapped session service is then applied to the received message. In this manner, a session service may be transparently applied to a packet flow over the wireless link independently of the other packet flows which may also be transmitted over the same wireless link.

A particular packet flow (flow) is associated with one or more session services to be applied to packets (messages) sent via the flow. The flow is identified either by a flow ID in the message itself, or by matching the message to a transmission profile indicative of characteristics of the flow. The characteristics of the flow establish a packet stream context, or common denominator, of the packets comprising the flow. For example, packets comprising streaming audio information are typically large, while http packets including ACK (acknowledgment) notifications are relatively small. Identification of the packet flow allows complementary session services to be applied at each endpoint of the wireless link, i.e. header compression applied when sending via the wireless link must be decompressed upon receipt.

A traffic flow mapping message is employed to initiate the flow and associate the session service(s) with the flow. Therefore, both endpoints of the wireless link, typically a base station processor (base station) and a subscriber access unit (subscriber) can identify the flow and related session service.

The session services may be identified by reference to a table of applicable session services. Once established, the session service is applied to all packets in the flow. In alternate embodiments, such a table may be stored in a common repository, and thus downloaded from a remote source in a standardized form. Standardization of the session services table would allow widespread dissemination and recognition of the session service identifiers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

In a wireless communication network, a wireless link provides a connection between sending process and receiving processes. The wireless link is typically a portion of the entire connection between the sending and receiving process, which also includes wired links on each side of the wireless link. A connection between sending and receiving processes comprises a packet flow. Each packet flow, represents a particular packet flow context indicative of the type of data carried between the processes, such as Internet web pages or streaming audio. There may be multiple connections, and hence, multiple packet flows, between a sending process and a receiving process. Further, each flow may include packets of different sessions between multiple peer processes. Since each flow has a particular packet flow context, indicative of a substantive characteristic of the type of data carried, it may be beneficial to apply a particular session service to each flow.

A session service is a dual ended or peer to peer mechanism that either adds functionality to an existing user data session or provides a new application capability. A session service, therefore, results in an additional processing step applied to or performed on a packet. A session service may provide a protocol optimization, such as header compression, a protocol conversion, such as a TCP proxy service, or a separate application for additional processing, such as QOS (Quality Of Service) processing and verification, or encryption. Other session services may be applied in accordance with the present invention. In a particular embodiment, the TCP proxy service is as defined in copending U.S. patent application Ser. No. 09/850,531, filed May 7, 2001, entitled "Dual Proxy Approach to TCP Performance Improvements Over a Wireless Interface," which was published on Dec. 25, 2003 as U.S. Patent Application Publication No. 2003/0235206 and incorporated herein by reference. In a wireless communications network, the session service may be applicable only to the flow over the wireless link, or may be applicable to the entire connection, and carried through (continuous) from the wired links over the wireless link.

Figure 1:
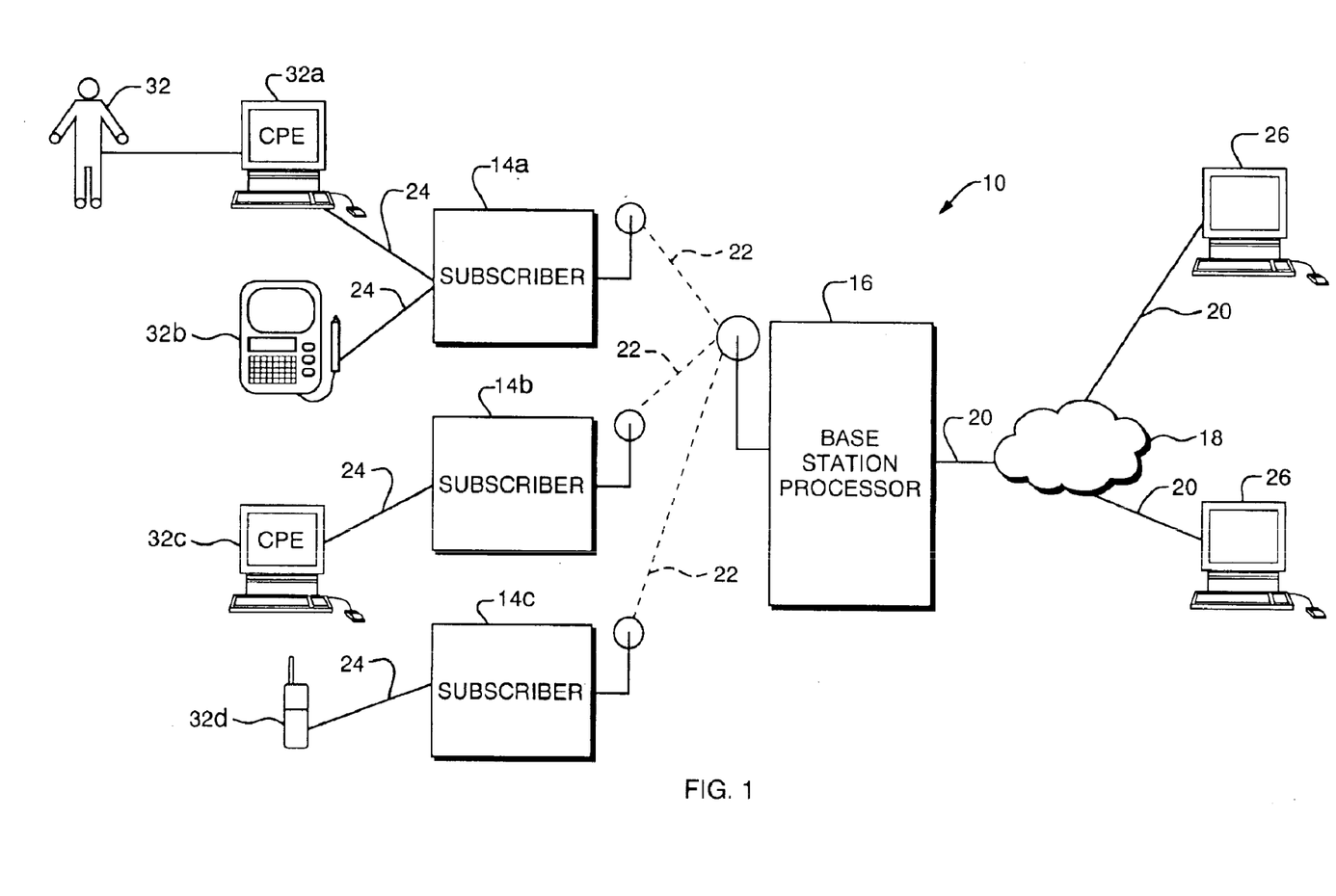
FIG. 1 shows a wireless communication system employing wireless communication links operable for use with the present invention.

FIG. 1 shows a wireless communication system 10 employing wireless communication links operable for use with the present invention. Referring to FIG. 1, a plurality of subscriber access units 14a–14c are in wireless communication with a base station processor 16 (base station) via wireless links 22. The base station 16 is also in communication with a data network such as the Internet 18 via a wired link 20. The subscribers 14 provide wireless Internet access to customer premises equipment (CPE) 32 generally, such as desktop PCs 32a, 32c, personal digital assistants (PDAs) 32b and wireless phones 32d through wired links 24. It should be noted that the wireless functionality provided by the subscriber access unit 14 may be in a stand alone device or embedded in the CPE 32 unit invoked by a user 32'. In either case the CPE 32 is operable to communicate with the Internet 18, and thus with remote nodes 26, via the base station 16 by employing the wired links 20, 24 and the wireless links 22.

Figure 2:
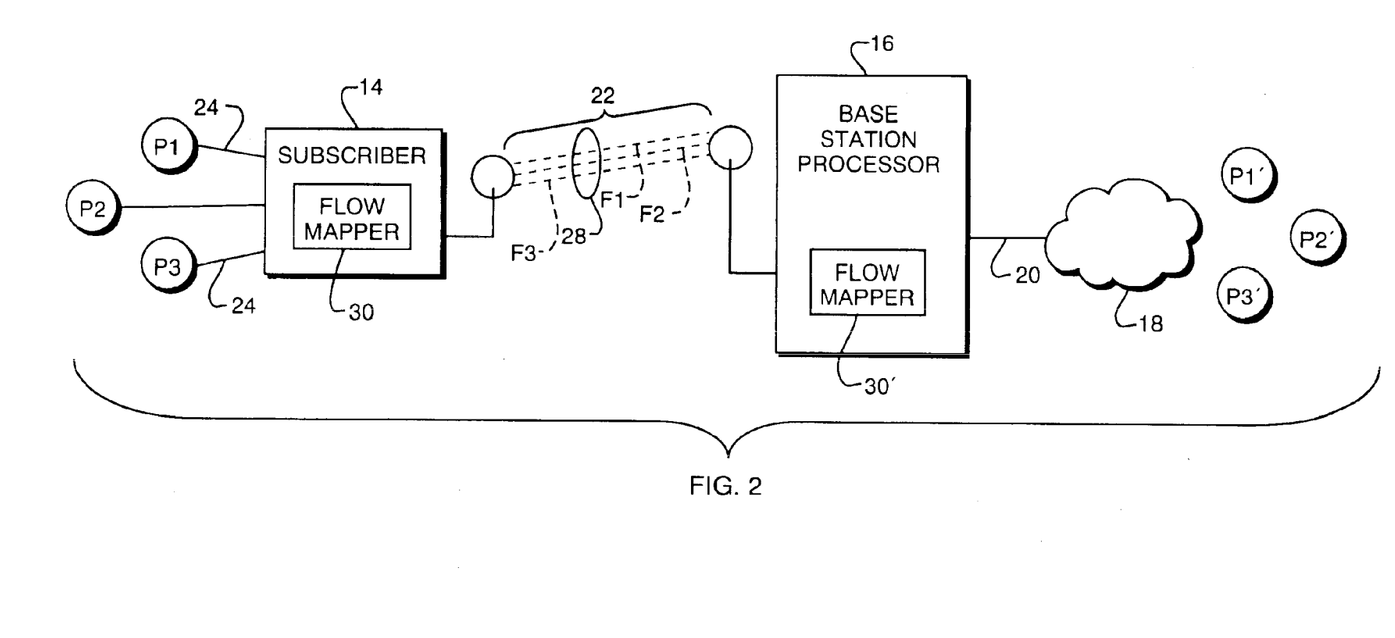
FIG. 2 shows wireless packet flows over a wireless link between a subscriber access unit and a base station processor.

FIG. 2 shows wireless packet flows over a communication link between a subscriber 14 and a base station 16. Referring to FIG. 2 and also to FIG. 1, the wireless link 22 between the subscriber 14 and the base station 16 further comprise packet flows 28. A packet flow 28 corresponds to one or more sessions over the wireless link 22, and is part of the connection (session) between processes which includes the wired links 20, 24. Each of the sessions in the packet flows 28 corresponds to a process P1, P2, or P3 at the subscriber 14. A complementary process P1', P2' and P3', either a sender or receiver, resides at a remote end of the connection on one of the remote nodes 26. A flow mapper 30 resides in the subscriber 14 and in the base station 16, at each endpoint of the wireless link 22, for assigning and determining the packet flow corresponding to each message packet, and for applying the respective session service, both described further below.

It should be noted that a packet flow includes packets that are related due to sharing a common denominator, such as a particular type of content. A packet flow, as described above, therefore may include packets corresponding to one or more sessions between peer processes. The term "session" denotes a connection between two application processes, between which packets are related because of a common source and destination. The correspondence between sessions and packet flows is typically dependent on the protocol and processes so communicating, and includes parameters such as source address, destination address, source port, destination port, and protocol in a TCP connection, for example (sometimes called a 5-tuple). Other packet flow/session mappings may be known to those skilled in the art. Accordingly, the packets sent in conjunction with the session may fall into one or more of the packet flows, as described further below with respect to applying session services to the flow.

Therefore, connections are established between each of the processes and their complementary counterparts: P1–P1', P2–P2', and P3–P3', employing the wired 20, 24 and wireless 22 links. Message packets sent over the wireless link 22 from one process to another are assigned to a flow 28 by the flow mapper 30 on the sending side of the wireless link 22, and identified as belonging to that flow 28 by the flow mapper 30' on the receiving side. The flow mapper 30 on the sending side applies the session service(s) associated with the assigned (determined) flow, and the flow mapper 30' on the receiving side also applies the session service(s) associated with the determined flow.

As described above, the flow mapper 30, 30' resides on both endpoints of the wireless link, at the subscriber 14 and the base station 16, and identifies packets as received from the wired link 20, 24 or the wireless link 22. When a packet is received from the wireless link 22, it already has a flow ID appended to it by the sender, either the subscriber 14 or base station 16. The received flow ID is mapped to a list of known flow IDs to determine the flow, and hence determines the session services associated with that flow.

If the packet is received from the wired side, the corresponding flow must be determined. A flow profile table, described further below, is employed to match the characteristics of the message to a known profile of packet flows using a filter. Factors such as originator IP address, destination IP address, TCP/IP port number, proxy ID, and others may be employed to match the packet to a flow via the filter. If the flow is determined, the corresponding flow ID is appended to the packet, in addition to applying the session services associated with the flow.

Flows requiring special processing provided by the session services are therefore enumerated in the flow table. Packets not matching a particular flow are deemed not to require special processing and therefore will not trigger application of session services. However, such packets will nonetheless be delivered to the proper destination via packet routing independently of application of session services as defined herein. Alternatively, a wildcard, or "catch all" entry (filter) may be added to the transmission profile table to cover packets which do not trigger other entries.

New flows may instantiated by a variety of ways. A particular application may have a need for a specific type of processing. Session service tables and the corresponding transmission profile table entries may be downloaded from an external source, described further below. Alternatively, failure to find a match in the transmission profile table would be employed to initiate creation of a new transmission profile entry. If a new flow is instantiated, the flow ID is determined from the new flow, and a traffic flow signaling message is employed to transmit the new flow information across the wireless link 22 to the receiving flow mapper 30'.

Figure 3:
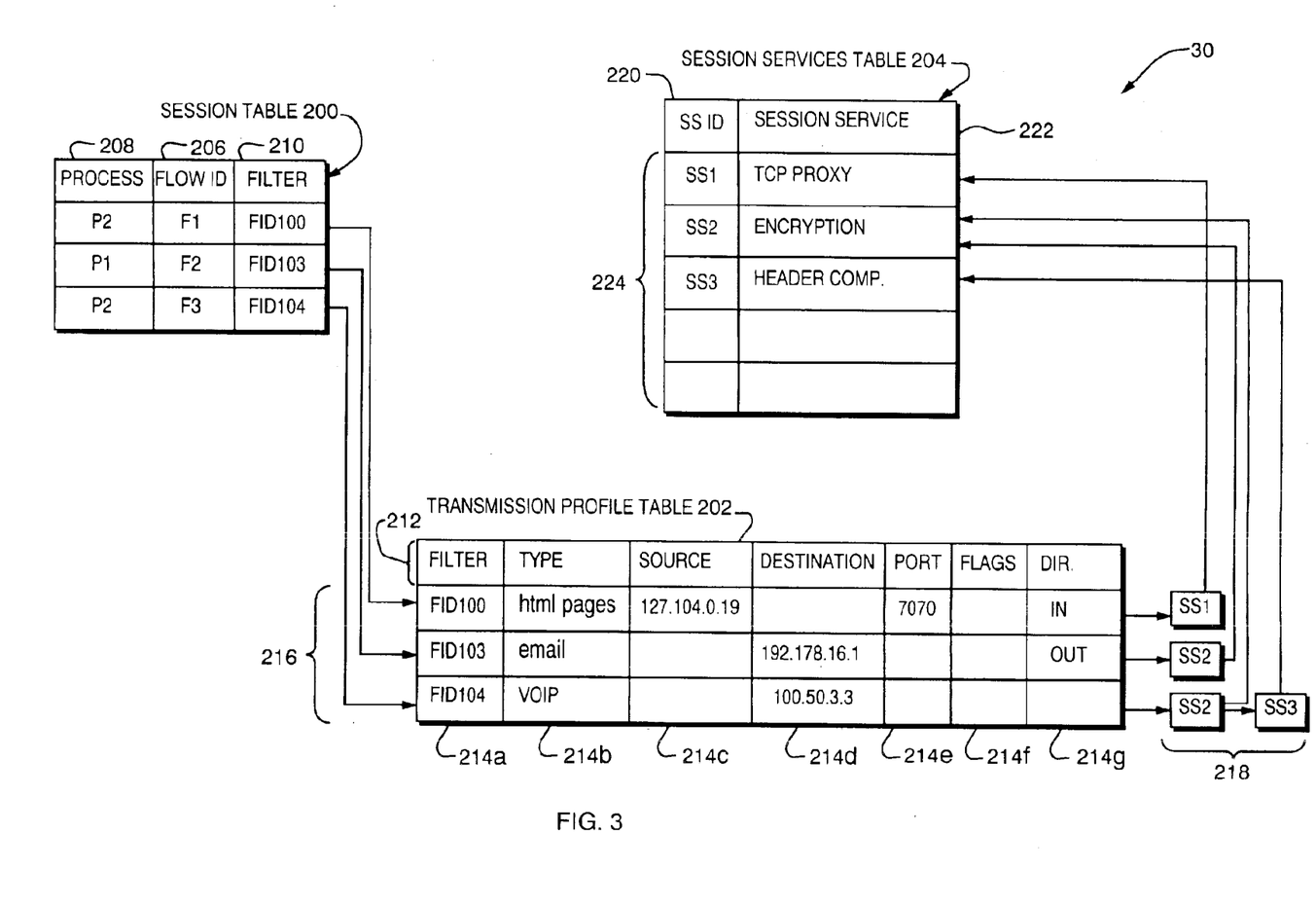
FIG. 3 shows mapping of packet flows to session services in the flow mapper.

FIG. 3 shows mapping of packet flows to session services in the flow mapper 30. Referring to FIG. 3, the tables included in the flow mapper are shown. The flow mapper 30 includes a flow table 200, a transmission profile table 202, and a session services table 204. The flow table 200 identifies the packet flows by flow ID 206. A process field 208 may be employed to identify the local process or processes to which it corresponds, however the packet routing information such as the port number is actually used for delivery. Also indicated are the filter 210 describing the packet flow. The transmission profile table 204 has transmission parameters 212 which describe each packet flow. The transmission parameters 212 describe the profile of each packet flow so that the packets in the flow may be identified by content, and includes a profile entry 216 for each packet flow. The transmission parameters illustrated include filter ID (FID) 214a, type 214b, source IP address 214c, destination IP address 214d, Port ID 214e, TCP/IP transmission flags 214f, and flow direction 214g. The transmission parameters shown are illustrative; alternate embodiments may employ filters with alternative fields and/or information. Each profile entry 216 also includes a list 218 of session services to be applied to the flow 206. Each element in the list 218 contains a session service index 220 into the session services table 204, which indicates the applicable session service 222. The session service table 204 contains session service entries 224, referenced by session service index 220, described further below. Note that the session service index 220 in the session service list 218 is shown as illustrative. Other mechanisms for associating the session services 222 to a profile entry 216 can be implemented and will be apparent to those skilled in the art, such as inclusion of session services 222 directly in the transmission profile table 202 or alternate pointer or array referencing, depending on a particular implementation.

Therefore, the applicable session service 222 to be applied to a particular message packet is determined in the flow mapper 30 by identifying the flow through either the flow ID 206 or profile entry 216, and mapping from the profile entry 216 to the corresponding session service entries 224, indicative of the session service(s) 222 to be applied. As indicated above, the message packets mapped by the flow mapper 30 include incoming and outgoing message packets. Message packets received over the wireless link (22, FIG. 2) from a remote flow mapper 30 have a flow ID 206 identified and append to the message packet, allowing a lookup in the flow table 200. Message packets received from the wired link 20, 24 for transmission over the wireless link 22 are identified by matching a profile entry 216 in the transmission profile table 202. The flow mapper 30 illustrated is shown from the perspective of the subscriber 14 for illustrative purposes, and is equally applicable to either endpoint of the wireless link 22.

Figure 4:
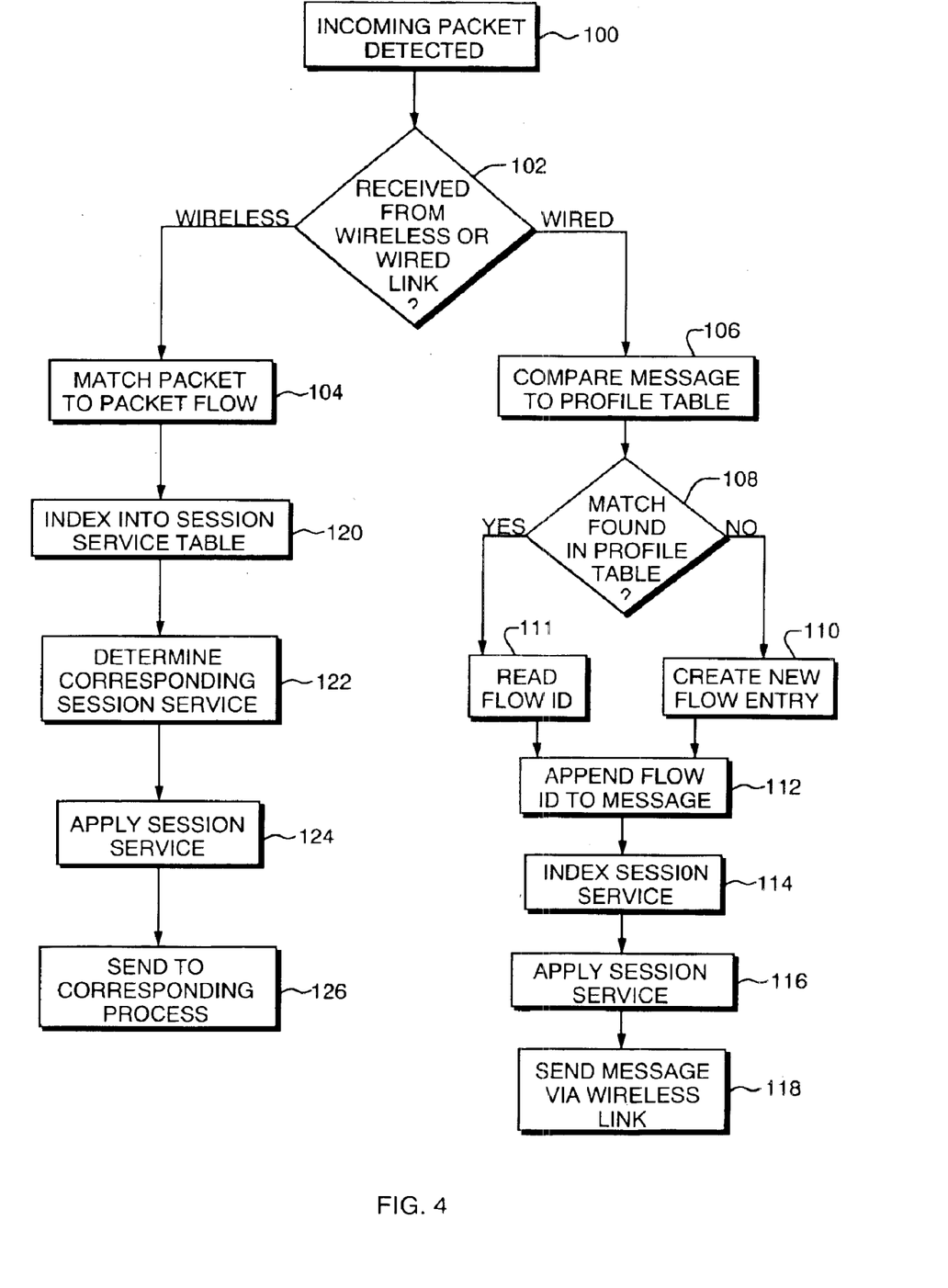
FIG. 4 shows a flowchart for mapping packet flows to session services.

FIG. 4 shows a flowchart for mapping packet flows to session services. Referring to FIGS. 4 and 2, an incoming packet is detected by the flow mapper 30, as depicted at step 100. A check is performed to determine if the incoming packet was received from the wireless link 22 or a wired link 20, 24, as shown at step 102. As described above, the flow mapper 30 resides on both endpoints of the wireless link 22. If the packet was received from the wireless link 22, then the flow ID was appended to the message prior to transmission. A lookup is performed in a flow table to match the packet to a packet flow, as disclosed at step 104. The flow ID is indexed into the session service table, as shown at step 120. The corresponding session service is determined, as shown at step 122, and applied to the message packet, as shown at step 124. The packet is then sent to the corresponding process P1–P3 via the wired link 24, as shown at step 126.

If the packet was received from the wired link 20, 24, then a comparison is performed with the message packet characteristics in a transmission profile table, as depicted at step 106, also described further below. A check is performed to determine if a match was found in the transmission profile table, as shown at step 108. If a match was not found, then either session services are not required for this packet, or a new flow entry is created, through an exchange of traffic flow signaling messages, as depicted at step 110 and described above with respect to FIG. 3. If a match was found, the flow ID is read from the transmission profile table, as depicted at step 111. In either case, the newly created or found flow ID is appended to the message, as disclosed at step 112. The corresponding session service is indexed in the session service table, as shown at step 114, and applied to the message packet, as depicted at step 116. The message is then sent over the wireless link 22 as a packet of the determined flow, as shown at step 118, for receipt by the remote flow mapper 30.

It should be noted that the flow ID determined prior to sending the wireless transmission is determined as described above and appended to the message prior to transmission. The flow Id may be appended in a variety of ways known to those skilled in the art. In a particular embodiment, the flow ID is encapsulated in an additional packet header which includes the flow ID. Other implementation protocols may be employed. Upon receipt of the wireless transmission, the flow ID is stripped off to yield the packet in it's form prior to wireless transmission. In this manner, the flow ID may be appended and removed from the message packet without interfering with the other delivery and data fields in the packet.

Figure 5A:
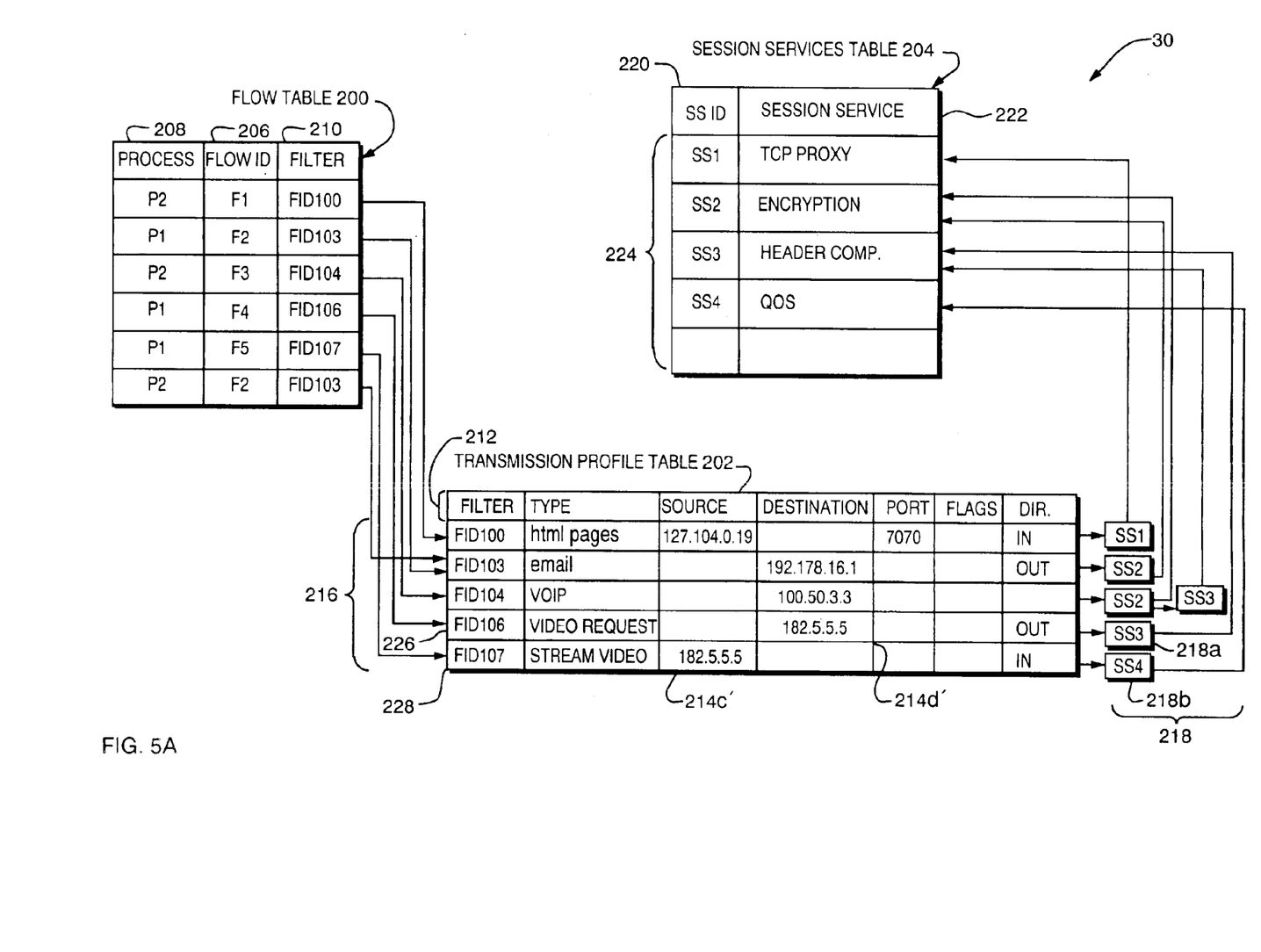
FIGS. 5a and 5b show an example of a process instantiating a new packet flow.
Figure 5B:
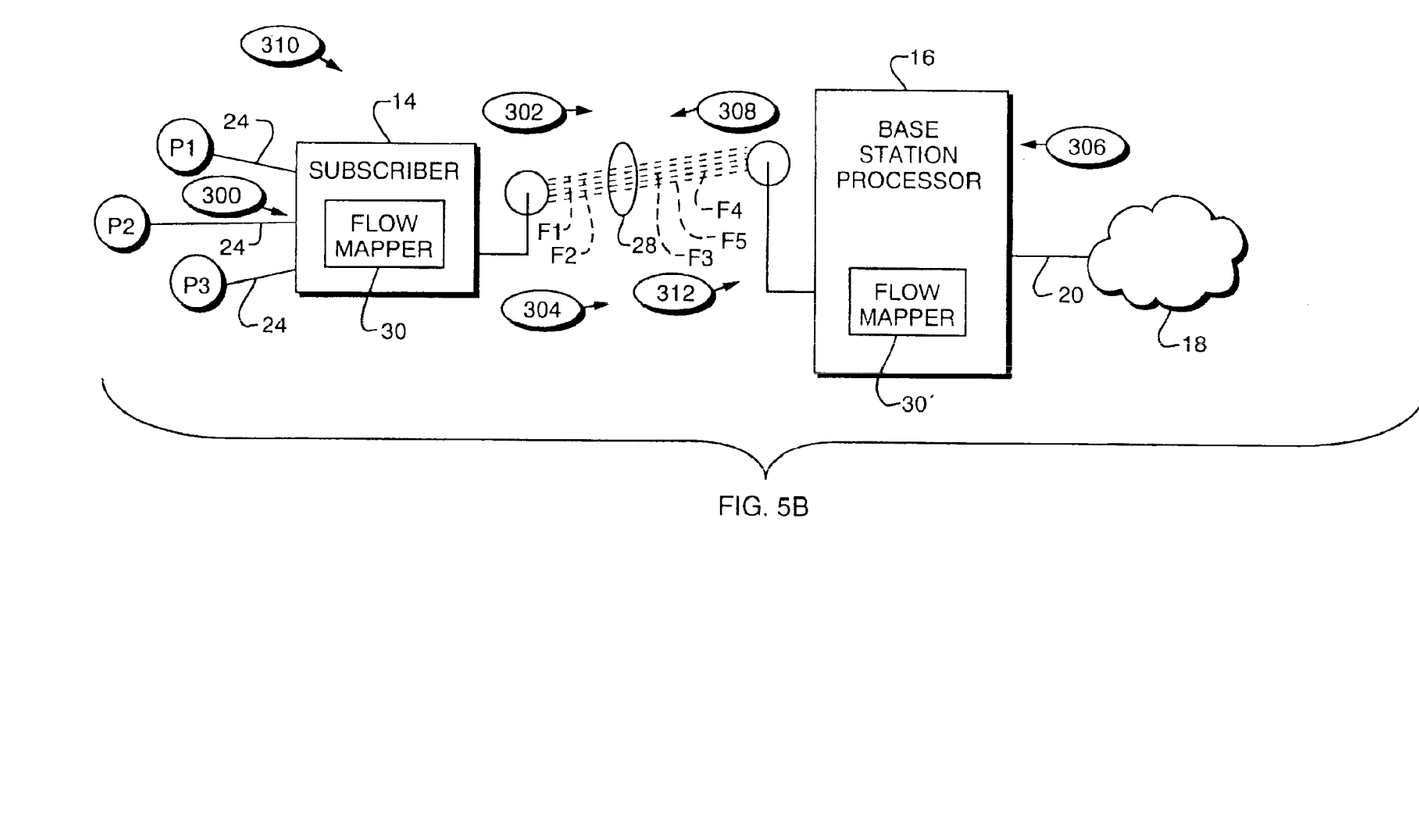

FIGS. 5a and 5b show an example of a process instantiating a new packet flow. Referring to FIGS. 5a, 5b, and again to 2, process P1 desires to initiate a streaming video request. Process P1 generates a message packet 300 indicative of the request, and forwards it via the wired link 24 to the subscriber 14. The flow mapper 30 receives the message packet 300 and attempts to find a corresponding profile entry 216 in the transmission profile table 202. No match is found, so the flow mapper 30 determines it will instantiate a new packet flow in the flow mapper 30. A new flow profile entry 226 is generated for the streaming video requests, indicative of the remote destination in field 214d', and is assigned filter FID 106. As these requests are deemed to be relatively small, the header compression system service is selected. A system service index 218a is created to indicate the system service 222 for header compression, as shown by system service index 218 SS3.

A new flow profile entry 228 is also created for the return streaming video message packets which will be received, having filter FID 107 has a source ID field 214c' of the streaming video source matching 214d'. A system service for RT QOS (Quality of Service) processing is selected. As there is no system service 222 entry for RT QOS yet, a new entry 224 is created for system service index 218b for SS4, and is associated with the flow profile entry 228. The RT QOS system service is exemplary; alternative system services for applying flow specific processing or operations could likewise be employed.

The flow mapper 30 generates a traffic flow signaling message 302 to send to the base station 16 indicative of the new flows F4 and F5. Following the traffic flow signaling message, which establishes the complementary system service processing at the remote flow mapper 30', the streaming video request message 300 is framed for transmission 304 via the wireless link. After processing via the remote destination 214d', a streaming video packet 306 is received by the base station 16. The base station, consistent with the traffic flow signaling, matches the source of the message with the flow profile entry 228. The flow mapper 30' appends the flow ID F5 to the message 308, and sends it over the wireless link 22 to the subscriber 14. The flow mapper 30 in the subscriber 14 reads the flow ID F5, finds the corresponding flow ID 206 in the flow table 200, and maps it to system service index SS5 for RT QOS processing.

Another streaming video request 310 is sent from process P1, and a corresponding match found for FID106 in the in the transmission profile table. Accordingly, system service index 218a is found to indicate header compression, applied to the request, and sent as message packet 312 via flow F4. System service flow mapping continues in this manner until the flow is no longer needed and the corresponding entries updated with another sequence of traffic flow signaling messages.

Figure 6:
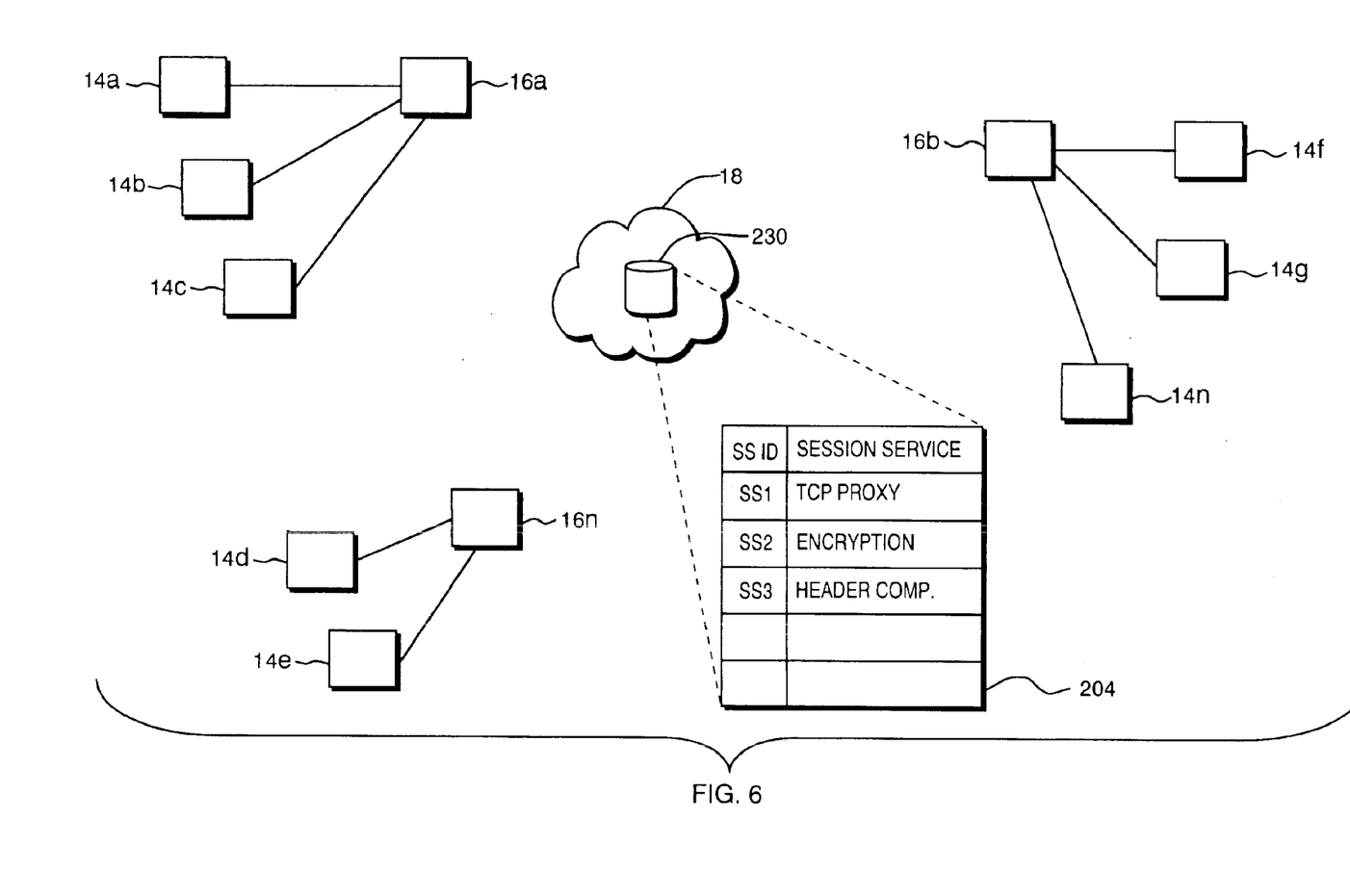
FIG. 6 shows downloading of session service identifiers from a common global repository.

In an alternate embodiment, shown in FIG. 6, the system service indices 220 are standardized in a system service table 204 stored in a common repository 230. The common repository is accessible via the Internet 18, and is employed to download a current version of the system service table 204 and versions of the system services themselves on a periodic basis. The common repository could be a Wireless Internet Facility (WIF), LDAP directory, or other web service accessible by the subscribers 14 and the base stations 16. A plurality 16a–16n of base stations may access and download the system service table 204 from the common repository 230. The base stations 16a–16n each transmit the downloaded system service table 204 and related files to each of the subscribers 14a–14n which they are in communication with. In this manner, a standardized index for each of the applicable system services is maintained across the wireless communication system 10.

System services may vary in complexity and depth of implementation. Accordingly, executable files and other implementation details may undergo revisions and modifications for the same session service. Periodic downloads from a common repository to upgrade and or add system services may occur. Further, additional flow profile entries (filters) may also be added to correspond to or identify a new session service or new need for a session service. In this instance, the flow profile table may be downloaded from the common repository as well. For a large service provider, there may be many flow mapper 30, 30' implementations deployed among many sites. Automatic, periodic downloading of a current state of system services therefore provides timely consistency among the many flow mappers 30, 30' which employ the system services.

The method of applying system services as described herein associates incoming packets to packet flows. The matching of message packets to flow profiles need not exactly match every packet in the flow to avoid disrupting the flow. Other mechanisms ensure delivery of the message packets to the intended recipients. Application of session services is intended to improve throughput by applying operations which tend to reduce overhead and increase the speed at which a packet is routed. If, for example, a packet between two processes which should have triggered a profile for header compression did not conform to the profile, that message packet would still be delivered, albeit without the benefit of header compression. If, however, a session service is applied at the sending side of the wireless link, then the flow ID would be appended and the complementary session service, such as decompressing the header, would be applied. Accordingly, while not all packets between two processes may necessarily be matched to a particular flow profile for sending over the wireless link, the packets that were matched, and thus processed in accordance with the system service at the sending side of the wireless link, would receive the complementary treatment at the receiving side of the wireless link. Therefore, the session services as defined herein are applied consistently at both endpoints of the wireless link. Further such services may be unilateral, and performed at one point along a wireless link, or bilateral, and applied in a complementary manner at both endpoints of the wireless link.

Those skilled in the art should readily appreciate that the system and methods for applying system services as defined herein are deliverable to a wireless device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for identifying and applying session services bidirectionally to a wireless link comprising:

establishing a connection including the wireless link, the wireless link being terminated at one end by an access terminal and at another end by a base station;

at both the access terminal and the base station, receiving a message for transmission via the connection;

attempting to identify a packet flow over the wireless link corresponding to the received message from a plurality of transmission profiles, each of the plurality of transmission profiles defining a packet flow and mapping the packet flow to at least one session service that is to be applied to messages of the packet flow;

selecting the at least one session service mapped to the identified packet flow of a corresponding transmission profile;

applying the mapped session service to the received message;

wherein if a packet flow fails to be identified for the received message, the method further comprises:

generating a first transmission profile and a second transmission profile, the first and second transmission profiles each defining a new packet flow corresponding to the received message, the first transmission profile mapping the new packet flow to a first set of session services, the second transmission profile mapping the new packet flow to a second set of session services that are complementary to the first set of session services; and sending a traffic flow mapping message to an opposing end of the wireless link, the traffic flow mapping message including the second transmission profile, thereby enabling the opposing end of the wireless link to identify messages of the new packet flow and to apply a complementary set of session services to the messages of the new packet flow.

2. The method of claim 1 wherein the wireless link further comprises a plurality of packet flows, each of the packet flows independently corresponding to at least one session service.

3. The method of claim 1 wherein identifying the packet flow further comprises comparing the message to a transmission profile.

4. The method of claim 1 further comprising establishing a flow ID indicative of the packet flow, and appending the flow ID to the message.

5. The method of claim 4 wherein establishing a flow ID further comprises a traffic flow mapping message adapted to provide traffic flow mapping signaling over the wireless link.

6. The method of claim 1 wherein identifying the packet flow further comprises examining a flow ID indicative of the packet flow.

7. The method of claim 1 wherein each of the packet flows corresponds to a stream of messages between a sending process and a receiving process.

8. The method of claim 7 wherein the stream of messages corresponds to a common context.

9. The method of claim 1 further comprising creating a new packet flow if no existing packet flows corresponding to the received message are identified.

10. The method of claim 1 further comprising sending a traffic flow mapping message indicative of a flow ID.

11. The method of claim 10 further comprising sending via the wireless link, the traffic flow mapping message between an access terminal and a base station.

12. The method of claim 1 wherein mapping the packet flows further comprises referencing a session service index indicative of a particular session service.

13. The method of claim 1 further comprising referencing a list of session services from a common repository, and mapping the packet flows further comprises indexing into the list from the common repository.

14. A method for identifying and applying session services bidirectionally to a wireless link, the wireless link being terminated at one end by an access terminal and at another end by a base station, the method comprising:
at both the access terminal and the base station,
receiving a traffic flow mapping message from an opposing end of the wireless link, the traffic flow mapping message including a transmission profile that defines a packet flow and at least one complementary session service to be applied to messages of the packet flow, the at least one complementary session service being complementary to a session service applied to the messages of the packet flow at the originating end of the wireless link;
receiving a message via the wireless link;
identifying a packet flow over the wireless link corresponding to the received message from a plurality of transmission profiles including the transmission profile provided in the traffic flow mapping message;
mapping the packet flow to the at least one complementary session service according to the transmission profile of the packet flow; and
applying the at least one mapped complementary session service to the received message.

15. The method of claim 14 wherein the identifying further comprises
examining a flow ID in the message; and
indexing, via the flow ID, into a flow table of flow IDs.

16. A method for identifying and applying session services bidirectionally to a connection including a wireless link, the wireless link being terminated at one end by an access terminal and at another end by a base station, the method comprising:
at both the access terminal and the base station,
receiving a message via the connection for transmission via the wireless link;
identifying a packet flow over the wireless link corresponding to the received message from a plurality of transmission profiles, each of the plurality of transmission profiles defining a packet flow and mapping the packet flow to at least one session service that is to be applied to messages of the packet flow;
selecting the at least one session service mapped to the packet flow from a corresponding transmission profile;
applying the mapped session service to the message for transmission;
wherein if a packet flow fails to be identified for the received message, the method further comprises:
generating a first transmission profile and a second transmission profile, the first and second transmission profiles each defining a new packet flow corresponding to the received message, the first transmission profile mapping the new packet flow to a first set of session services, the second transmission profile mapping the new packet flow to a second set of session services that are complementary to the first set of session services; and
sending a traffic flow mapping message to an opposing end of the wireless link, the traffic flow mapping message including the second transmission profile, thereby enabling the opposing end of the wireless link to identify messages of the new packet flow and to apply a complementary set of session services to the messages of the new packet flow.

17. The method of claim 16 wherein identifying further comprises:
examining transmission parameters of the message;
comparing the transmission parameters to a transmission profile of known packet flows; and
matching, based on the transmission parameters, one of the transmission profiles.

18. A method for identifying and applying session services bidirectionally to a wireless link comprising:
establishing a wireless link between an access terminal and a base station;
at both the access terminal and the base station,
receiving a packet for transmission via the wireless link;
identifying a plurality of packet flows within the wireless link, each packet flow corresponding to a packet stream context;
comparing the packet flow to the plurality of packet stream contexts;
matching the received packet to a packet stream context based on the comparing;
identifying at least one session service corresponding to the packet stream context;
applying the at least one session service to the packet;
wherein if a packet stream context fails to be matched to the received packet, the method further comprises;
generating a first transmission profile and a second transmission profile, the first and second transmission profiles each defining a new packet flow with a packet stream context that corresponds to the received message, the first transmission profile mapping the new packet flow to a first set of session services, the second transmission profile mapping the new packet flow to a second set of session services that are complementary to the first set of session services; and sending a traffic flow mapping message to an opposing end of the wireless link, the traffic flow mapping message including the second transmission profile, thereby enabling the opposing end of the wireless link to identify messages of the new packet flow and to apply a complementary set of session services to the messages of the new packet flow.

19. The method of claim 18 further comprising applying the session service to other packets in the packet flow.

20. A system for identifying and applying session services bidirectionally to a wireless link comprising:

an access terminal and a base station, the wireless link being terminated at one end by the access terminal and at another end by the base station;

a connection including the wireless link, the wireless link having at least one packet flow corresponding to a flow context;

both the access terminal and the base station further comprising:

a flow table;

a flow mapper operable to receive a message via the connection and attempt to identify a packet flow corresponding to the received message from a plurality of transmission profiles stored in the flow table, each of the plurality of transmission profiles defining a packet flow and mapping the packet flow to at least one session service that is to be applied to messages of the packet flow;

the flow table in the flow mapper operable to select the at least one session service mapped to the identified packet flow from a corresponding transmission profile; and a system service manager operable to apply the at least one session service to the received message;

wherein if the flow mapper fails to identify a packet flow for the received message, then;

the flow mapper generates a first transmission profile and a second transmission profile, the first and second transmission profiles each defining a new packet flow corresponding to the received message, the first transmission profile mapping the new packet flow to a first set of session services and stored in the flow table, the second transmission profile mapping the new packet flow to a second set of session services that are complementary to the first set of session services; and the flow mapper further sends a traffic flow mapping message to an opposing end of the wireless link, the traffic flow mapping message including the second transmission profile, thereby enabling the opposing end of the wireless link to identify messages of the new packet flow and to apply a complementary set of session services to the messages of the new packet flow.

21. The system of claim 20 wherein the wireless link further comprises a plurality of packet flows, each of packet flows independently corresponding to at least one session service.

22. The system of claim 20 further comprising a transmission profile table wherein the flow mapper is further operable identify the packet flow by comparing the message to the transmission profile table.

23. The system of claim 20 wherein the message further comprises a flow ID indicative of the packet flow.

24. The system of claim 23 further comprises a traffic flow mapping message operable to provide traffic flow mapping signaling of the flow ID over the wireless link.

25. The system of claim 23 wherein the flow table further includes the flow ID and the flow mapper is further operable to identify the packet flow by indexing the flow ID.

26. The system of claim 20 further comprising a sending process and a receiving process wherein each of the packet flows corresponds to a stream of messages between the sending process and the receiving process.

27. The system of claim 20 wherein each of the at least one of the packet flows further comprises a stream of packets corresponding to a common context.

28. The system of claim 20 wherein the flow mapper is further operable to create a new packet flow if no existing packet flows correspond to the received message are identified.

29. The system of claim 20 wherein the traffic flow mapper is further operable to create a new packet flow in response to a traffic flow mapping message.

30. The system of claim 20 further comprising a session service index indicative of a particular session service.

31. The system of claim 20 further comprising a session service table including a list of session services wherein the flow mapper is further operable to map the packet flow by examining the session service table.

32. The system of claim 31 wherein the flow mapper is further operable to access the session service table from a common repository.

33. A computer program product having computer program code for identifying and applying session services bidirectionally to a wireless link, the wireless link being terminated at one end by an access terminal and at another end by a base station, at both the access terminal and the base station the computer program product comprising computer program code for:

receiving a message for transmission via the connection;

identifying a packet flow over the wireless link corresponding to the received message from a plurality of transmission profiles, each of the plurality of transmission profiles defining a packet flow and mapping the packet flow to at least one session service that is to be applied to messages of the packet flow;

selecting the at least one session service mapped to the identified packet flow from a corresponding transmission profile;

applying the mapped session service to the received message;

wherein if a packet flow fails to be identified for the received message, the method further comprises;

generating a first transmission profile and a second transmission profile, the first and second transmission profiles each defining a new packet flow corresponding to the received message, the first transmission profile mapping the new packet flow to a first set of session services, the second transmission profile mapping the new packet flow to a second set of session services that are complementary to the first set of session services; and sending a traffic flow mapping message to an opposing end of the wireless link, the traffic flow mapping message including the second transmission profile, thereby enabling the opposing end of the wireless link to identify messages of the new packet flow and to apply a complementary set of session services to the messages of the new packet flow.

34. A system for identifying and applying session services bidirectionally to a wireless link comprising:

means for establishing a connection including the wireless link, the wireless link being terminated at one end by an access terminal and at another end by a base station;

both the access terminal and the base station further comprising:

means for receiving a message for transmission via the connection;

means for identifying a packet flow over the wireless link corresponding to the received message from a plurality of transmission profiles, each of the plurality of transmission profiles defining a packet flow and mapping the packet flow to at least one session service that is to be applied to messages of the packet flow;

means for selecting the at least one session service to the identified packet flow from a corresponding transmission profile; and means for applying the mapped session service to the received message;

wherein if a packet flow fails to be identified for the received message, the system further comprises:

means for generating a first transmission profile and a second transmission profile, the first and second transmission profiles each defining a new packet flow corresponding to the received message, the first transmission profile mapping the new packet flow to a first set of session services, the second transmission profile mapping the new packet flow to a second set of session services that are complementary to the first set of session services; and means for sending a traffic flow mapping message to an opposing end of the wireless link, the traffic flow mapping message including the second transmission profile, thereby enabling the opposing end of the wireless link to identify messages of the new packet flow and to apply a complementary set of session services to the messages of the new packet flow.

35. An apparatus for applying session services bidirectional to individual packet flows traversing a wireless link comprising:

a forward link communication interface, for one of receiving or transmitting messages via a forward wireless link;

a reverse link communication interface, for one of receiving or transmitting messages via a reverse wireless link; and a flow table, being operable to map a first set of session services for a packet flow traversing the reverse wireless link and a second set of session services for the packet flow traversing the forward wireless link;

the flow table capable of being updated upon receipt of a traffic flow mapping message from an opposing end of the wireless link, the traffic flow mapping message identifying new packet flows and complementary session services to be applied to the new packet flows originating from the opposing end of the wireless link.

36. The apparatus of claim 35 wherein the first set of session services for the reverse link is complementary to the second set of session services for the forward link.

* * * * *